Jan. 16, 1968    O. C. NORTON ETAL    3,364,417
OPERATION GUIDANCE AND CONTROL ARM
Filed Aug. 11, 1964
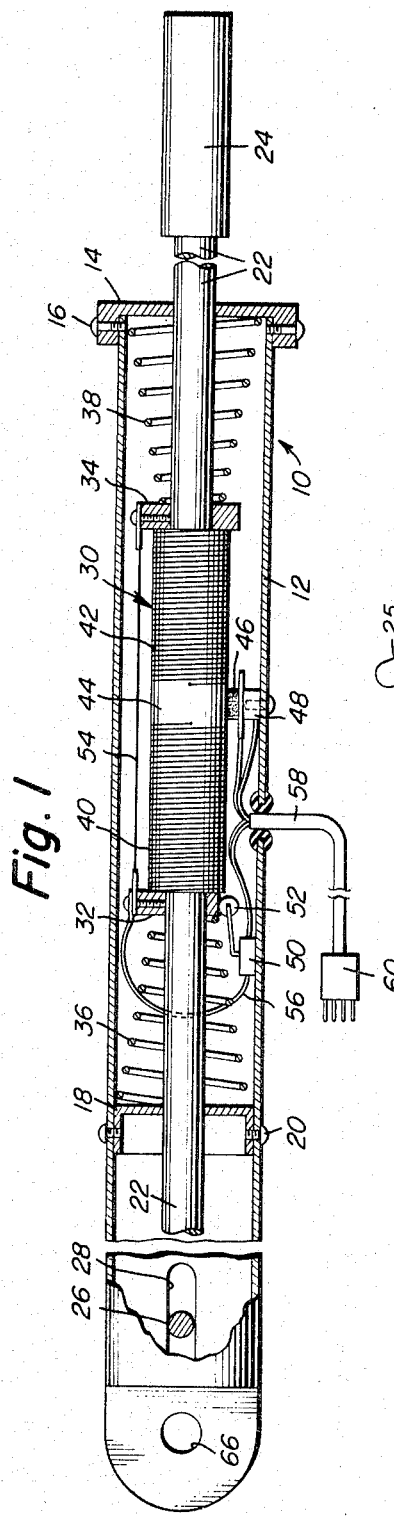
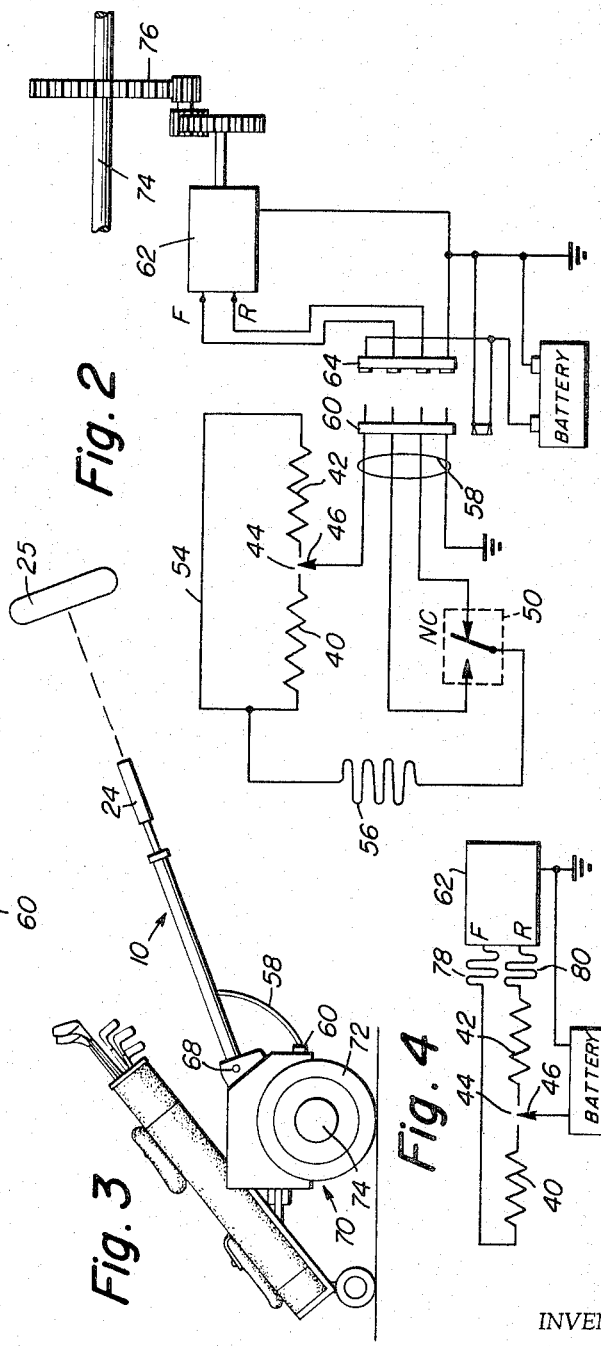
INVENTORS
Orlo C. Norton
Will J. Schaaf

United States Patent Office 3,364,417
Patented Jan. 16, 1968

3,364,417
OPERATION GUIDANCE AND CONTROL ARM
Orlo C. Norton, 544 Virginia Ave. 16505 and Will J. Schaaf, 806 Baldwin Bldg. 16501, both of Erie, Pa.
Filed Aug. 11, 1964, Ser. No. 388,819
9 Claims. (Cl. 323—94)

This invention relates generally to guides, and more particularly it pertains to a shaft-like handle for the purpose of controlling an operation both mechanically and electrically.

In the operation of many machines, vehicles, and the like, it is required to manually position a control in several planes of movement. Probably the most involved type of such a control is in aircraft where one handle is used to position several airfoils and thus give guidance in three dimensional space. Still another area of control is often required, namely a throttle and this can often be electrically operated. Some machines may even require that in addition to proportional speed control the direction of travel be reversible.

To provide such flexibility of control of a machine with one handle, is a principal object of this invention.

Another object of this invention is to provide a universal control arm which is operable by the natural movements of side to side, up and down, and forward and backward to cause the same response in a machine.

Another object of this invention contemplates the provision of a control arm which will stop the machine when the handle is released.

Still another object of the invention is the provision of a handle as an article of commerce which can be attached to a wide variety of motor controlled vehicles for steering them and controlling their speed and direction of travel.

Other objects and attendant advantages of this invention will become more readily apparent and understood from the following detailed specification and single sheet of accompanying drawings in which:

FIG. 1 is a view of a guidance and control arm embodying principles of this invention shown partially broken away for clarity of detail;

FIG. 2 is a schematic diagram depicting the electrical connections of the arm of FIG. 1 together with an electric motor controlled thereby;

FIG. 3 is a side view of a golf cart equipped with the novel guidance and control arm; and FIG. 4 is a schematic diagram of a simplified motor control as adapted to low voltage operation such as for the golf cart of FIG. 3.

Referring now to the details of the drawings as shown in FIG. 1, reference numeral 10 indicates generally a guidance and control arm. This control arm 10 consists of an elongated tube or casing 12. A cap 14 is mounted on one end of the casing 12 with screws 16. A cup spacer 18 is mounted inside the casing 12 intermediate its ends by screws 20. Both the cap 14 and spacer 18 are centrally apertured to slidably receive a long rod 22. One end of this rod 22, therefore, protrudes to the exterior and is provided with a handle grip 24, or alternately a steering wheel 25, shown in FIG. 3, may be there mounted.

The rod 22 is transversly provided with a pin 26 at its other end. This pin 26 extends on both sides from the rod 18 through a pair of diametrically opposed longitudinal slots 28 in the casing 12.

A tubular resistor insulator body 30 is mounted by end support members 32 and 34 on the rod 22 inside the casing 12. When the pin 26 is midway the ends of the slots 28, this resistor body 30 is retained in a normal position midway between the cup spacer 18 and cap 14 by conical wire springs 36 and 38.

The resistor body 30 mounts two resistor surfaces 40 and 42 separated by an electrically non-conductive center zone 44 of the same diameter. These resistor surfaces 40 and 42 may be carbon cylinders, metallic film coatings, or the resistance wire windings as shown.

A resilient contact or brush 46 is mounted on an insulator 48 to the inside of the casing 12 so as to bear against the center zone 44 of the resistor insulator body 30 when the latter is in its normal position. A sensitive switch 50 having its actuator finger provided with an insulated roller 52 is also mounted inside the case 12.

Switch 50 is located so that it "throws" an electrical circuit when the insulator body 30 moves from its normal position and engages with the insulated roller 52. This switch 50 may be at either end of the body 30 as desired or required for special circuitry.

Electric contact is also made at this time by the brush 46 engaging one or the other of the resistor surfaces 40 or 42. The opposite ends of these surfaces 40 and 42 are connected together by a wire 54. A flexible insulated extension 56 of this wire 54 leads to the switch 50. The electrical connections from the switch 50 as well as from the brush 46 pass into a common multi-conductor electric cord 58 leading to the exterior of casing 12 and terminating in a connector plug 60.

The end of the casing 12 remote from the cap 14 may have any configuration depending upon the machine to be guided. For example, if the guidance arm 10 is to function as a steering shaft with a steering wheel in place of grip 24 the lower end of casing would likely terminate in a worm gear. Thus, the rotation of the steering wheel, would be transmitted by the rod 22 to the pin 26, thence to the casing 12 to turn the worm gear.

In addition to this function, a push on the wheel will shift the resistor body 30 to engage brush 46 with resistor surface 42. At the same time switch 50 is operated as roller 52 is depressed by engagement with body 30. Proportionally less of the resistor surface 42 is in circuit to wire 54 as the rod 22 is more positively thrust inwardly against spring 36 and this can be employed to increase the current and so the speed of a motor.

In the reverse or pull movement of rod 22 the roller 52 becomes disengaged from body 30 and the switch 50 throws to its other position. This action may be used to reverse connections to the forward and reverse directional windings F and R of a motor 62 as shown in FIG. 2.

For ready servicing the wiring of guidance arm 10 may be disconnected easily from a jack 64.

For use as a tiller for water craft or land vehicles, such as carts, the end of guidance arm 10 is flattened and provided with a hole 66 whereby it can be secured by a pivot bolt 68 to a cart 70 as shown in FIG. 3. The cart 70 is propelled by drive wheels 72 having an axle 74. This axle 74 is coupled, through reduction gearing 76 if desired, to motor 62 as shown in FIG. 2. Thus a pull on the hand grip 24 causes the motor 62 to start and the cart 70 will follow the operator at a speed depending upon the degree of tug. If he pushes on the hand grip 24 the cart 70 will move in the pushed direction, likewise at a rate proportional to the degree of push. With "hands off" the motor 62 will cease to rotate and the cart 70 will stop.

FIG. 4 illustrates a simplified version of the invention in that the center zone 44 acts as the switching on and off means for the motor 62 as well as the switching on of the directional windings F and R as well. This however requires two flexible wires 78 and 80 (similar to wire 56) leading separately from the resistor surfaces 40 and 42 respectively but does eliminate the reversing switch 50. This is probably satisfactory for low voltage applications only.

The direct manual control combined with remote electric control of the above described operation handle suggests a great many other applications. For example remote solenoids or magnets may be proportionally excited and the resulting thrust or pull caused to move ailerons or elevators, change propeller pitch, position throttle valves or perform other functions in aircraft mechanism where response to push-pull hand movements is desired together with a directly linked function from the arm.

Obviously many modifications and variations of the present invention are possible in light of the above teachings. It is, therefore, to be understood that within the scope of the appended claims the invention may be practiced otherwise than as specifically described.

What is claimed is:

1. An operation guidance and control arm, comprising, an elongated casing, a rod extending lengthwise of said casing and arranged to reciprocate therein, a grip on said rod extending exteriorly of casing, an electrical circuit including a pair of spaced variable resistance elements and contact means, said resistance element being positioned on said rod, said contact means being positioned in said casing to alternately contact said resistance elements on a line thereon parallel with and depending on the reciprocated position of said rod, whereby the included portion of the alternately contacted resistance element in said electrical circuit is proportioned to the reciprocated position of said grip, and reversing switch means for reversible utilization of the electrical condition of said electrical circuit depending on the alternate contact of said contact means with said resistance elements.

2. An operation guidance and control arm as recited in claim 1, and means for biasing said rod to an equilibrium position in which said contact means is inbetween said resistance elements.

3. The universal control arm as recited in claim 1, wherein said casing has a pair of spaced stationary elements extending transversely thereof, and biasing means extending from said stationary elements to position said rod member in an equilibrium position of reciprocation between said resistance elements representative of an electrical open circuit.

4. The universal control arm as recited in claim 3, wherein said biasing means includes a pair of opposing springs.

5. The universal control arm as recited in claim 1 wherein said pair of variable resistance elements are arranged in tandem with an insulating space therebetween.

6. The universal control arm as recited in claim 1, wherein the low resistance ends of said variable resistance elements are connected in circuit with each other.

7. The universal control arm as recited in claim 1 wherein said elongated case has a pair of diametrically opposed longitudinal slots and said rod has a pin element extending transversely therefrom to engage each of said slots to prevent rotation of said rod independent of said elongated casing.

8. A universal control arm, comprising means including a rotatable elongated casing, a rod member arranged along said casing to reciprocate therewithin and to effect rotation thereof, said rod member having a hand grippable portion for manipulation thereof, and electrical circuit means including a pair of spaced variable resistance elements mounted on said rod and a contact mounted for relative movement with respect to said resistance elements upon reciprocation of said rod member for determining a reversible electrical condition in said electrical circuit means for further utilization.

9. A universal control arm, comprising means including an elongated casing which is movable, means including a rod member arranged to reciprocate longitudinally within said casing and to effect movement thereof, said rod member having a hand grippable portion for manipulation thereof, and electrical circuit means including a pair of spaced variable resistance elements mounted on said rod and a contact mounted for relative movement with respect to said resistance elements upon reciprocation of said rod member for determining a reversible electrical condition in said electrical circuit means for further utilization.

References Cited

UNITED STATES PATENTS

| | | | |
|---|---|---|---|
| 1,491,077 | 4/1924 | Beerworth | 287—58 X |
| 2,138,239 | 11/1938 | Irgens | 180—19 |
| 2,617,911 | 11/1952 | Carey et al. | 338—78 |
| 2,807,695 | 9/1957 | Delmonte | 388—150 |
| 2,879,858 | 3/1959 | Thomas | 180—19 |
| 2,937,706 | 5/1960 | Chandler | 180—19 |
| 3,090,459 | 5/1963 | Scudder | 180—19 |
| 3,225,853 | 12/1965 | Norton et al. | 180—19 |

BENJAMIN HERSH, *Primary Examiner.*

J. E. PEKAR, *Assistant Examiner.*